United States Patent [19]

Bickoff et al.

[11] 3,747,564

[45] July 24, 1973

[54] METHOD OF PREPARING ANIMAL LITTER

[75] Inventors: Emanuel M. Bickoff; George O. Kohler, both of El Cerrito, Calif.

[73] Assignee: The United States of America as represented by the Secretary of Agriculture, Washington, D.C.

[22] Filed: Nov. 17, 1971

[21] Appl. No.: 199,803

[52] U.S. Cl. .................................................. 119/1
[51] Int. Cl. ........................................... A01k 13/00
[58] Field of Search ........................... 119/1; 8/125

[56] References Cited
UNITED STATES PATENTS

| 3,286,691 | 11/1966 | McFadden | 119/1 |
|---|---|---|---|
| 2,179,591 | 11/1939 | Godchaux | 119/1 |
| 2,014,900 | 9/1935 | Lapp | 119/1 |
| 2,126,809 | 8/1938 | Pratt | 8/125 |
| 3,425,397 | 2/1969 | Schulein et al. | 119/1 |
| 3,059,615 | 10/1962 | Kuceski et al. | 119/1 |
| 2,649,759 | 8/1953 | Gibbs | 119/1 |
| 2,597,457 | 5/1952 | Cook | 119/1 |

*Primary Examiner*—Louis G. Mancene
*Assistant Examiner*—James H. Czerwonky
*Attorney*—R. Hoffman et al.

[57] ABSTRACT

Animal litter of improved quality is prepared from leafy green vegetable material by a procedure which includes removal of precursors of offensive odor-causing elements. The material is washed, compressed and dehydrated, and contains a sufficient amount of ammonia to preserve a given ph level. The material may also contain an active quantity of chlorophyll and be suitably colored.

8 Claims, No Drawings

METHOD OF PREPARING ANIMAL LITTER

A non-exclusive, irrevocable, royalty-free license in the invention herein described, throughout the world for all purposes of the United States Government, with the power to grant sublicenses for such purposes, is hereby granted to the Government of the United States of Amercia.

DESCRIPTION OF THE INVENTION

The invention relates to and has among its objects the provision of animal litter of new and improved properties, and novel procedures for preparing it from alfalfa or other leafy green crops. Further objects of the invention will be evident from the following description wherein parts and percentages are by weight unless otherwise specified.

In the following description, emphasis is directed to the use of alfalfa as the starting material. Although alfalfa is preferred for the purposes of the invention, reference to this particular crop is only by way of illustration, not limitation. In its broad ambit the invention is applicable to leafy green crops in general, for example, grasses, lespedeza, clover, alfalfa, and similar conventional forages, and other leafy green vegetable materials such as lettuce, cabbage, kale, pea or bean vines, celery tops, beet tops, and the like, grown deliberately for animal feeding or available as wastes or by-products from food packing or processing establishments.

For some time, clay, sawdust, straw, chopped paper, and the like have been used as a litter to keep animal wastes in a relatively dry condition until disposal is possible. However, materials of this type have various disadvantages. They are light in color and thus afford no disguising or masking effect. Also, they exhibit poor odor-absorbing properties so that when waste is deposited thereon by a pet or other animal, the litter must be quickly replaced to avoid fouling the atmosphere of the household.

More recently, dried alfalfa pellets have been introduced for use as animal litter. This product is made by dehydrating green alfalfa in a rotary kiln or other conventional drier, and then pelletizing the dried material. The product in question is superior to such litters as clay, straw, sawdust, paper, etc. because it has better moisture and odor absorption properties and its content of chlorophyll serves as a deodorizer of animal waste deposited thereon. Moreover, the product has a dark color so that it acts to mask or camouflage fecal matter.

Although pelletized dehydrated alfalfa or other leafy material possesses certain advantages as noted above, it suffers from certain disadvantages. Noteworthy among these is that it exhibits a strong characteristic odor which many persons find repellent. Because of this odor problem the commercial success of the product has been limited.

A primary object of the invention is the provision of means for obviating the problem outlined above. In particular, the invention provides procedures for preparing animal litter which—though made from leafy material—is essentially free from the characteristic odor exhibited by dehydrated leafy material. The litter prepared in accordance with the invention not only obviates a problem of the prior art products, but also retains the advantages of the known products prepared from alfalfa and other leafy crops. In particular, the products of the invention have a dark color so that they are effective in masking or camouflaging animal wastes deposited thereon. They display a high moisture absorption so that liquidous wastes are absorbed and retained therein. They contain chlorophyll in adequate amount to suppress and destroy odors emanating from animal wastes. They are edible in the sense that if a pet or other animal should ingest some of the product, no harm will result.

A critical feature of the invention is that the green alfalfa or other leafy green material, prior to drying, is subjected to at least one cycle of pressing and washing with water. This procedure causes the removal of certain substances which may be referred to as precursors of offensive odor-causing elements. In other words, the process of the invention removes substances which normally would give rise to undesirable odorous elements. This situation is further explained as follows:

It is well known that when alfalfa is in a moist (green) state, it exhibits a mild and pleasant odor. When, however, the alfalfa is subjected to conventional dehydration, a rank, unpleasant odor is developed in the product. In sum, certain substances of unknown nature within the plant material act as odor precursors in that the application of dehydrating conditions causes chemical changes whereby these precursors, which have little or no odor, are converted into elements which exhibit the strong and unpleasant aroma. However, by the procedures of the invention, this undesired effect is avoided because the odor precursors are removed prior to application of the dehydration step.

A further advantage of the invention is that it causes removal of sugars from the alfalfa material. As a result, the product is essentially biologically inert; that is, it is a poor medium for the growth of molds and other microorganisms. Thus, when the product is moistened--as by deposition of urine thereon--little if any fermentation or mold growth takes place. In contrast, products which retain their natural sugar content will ferment rapidly when moistened, whereby offensive and noxious odors are produced.

The practice of the invention is next described in some detail, having reference to alfalfa by way of example.

In usual farming practice, alfalfa is chopped as it is harvested; this conventional chopped green plant material is the starting material of choice for the process of the invention.

I. The green alfalfa material is de-juiced by passing it through a press which may take the form, for example, of a set of conventional sugarcane rolls. Other devices which may be used for the de-juicing are screw presses or expellers. In this de-juicing operation, there is produced a juice fraction and a press-cake of the solid alfalfa material. In this operation, most of the odor precursors present in the original material are transferred to the juice fraction, which is discarded.

II. The press-cake is next washed with water, whereby to extract a further portion of the odor precursors to the wash water, the latter being discarded.

To secure good contact between the alfalfa material and water, it is preferred to break up the press-cake into small particles. For example, the press-cake is introduced into a tank with about 0.5 to 10 times its weight of water and agitation is applied—as by the use of a power-driven propeller—to break up the press-cake and mix the resulting particles with the aqueous phase. Following this, the water and alfalfa material are separated as by applying screening, centrifugation, decanting or the like. Alternatively, the mixture of water and alfalfa material, without any separation step, is directed to the next operation.

III. The alfalfa material from Step II is re-pressed as in Step I to de-water it, a further allotment of odor precursors being eliminated with the press water.

IV. The press-cake from Step III is then dehydrated by conventional means, for example, in a rotary kiln supplied with a draft of hot gaseous products of combustion.

V. Preferably, the dehydrated material is compressed into pellets or other particulate form. Typically, pellets having a size of about one-sixteenth to one-fourth inch are formed.

It is within the purview of the invention to apply the above-described washing and pressing steps more than once to attain a product of particular low odor value. For example, the press-cake from Step III may be re-washed and re-pressed before it is subjected to dehydration (Step IV).

Prior to the de-juicing operation (Step I), the green alfalfa may be treated with ammonia to preserve its chlorophyll content at a high level. Since chlorophyll is responsible for the product's excellent deodorizing properties, a high concentration, therefore, is obviously desired. Where this modification of the invention is applied, enough ammonia is added to give the alfalfa a pH of at least 7, preferably about 8.0 – 8.5. (The natural pH of alfalfa is 5.5 to 6.5.) Ammoniation is most easily effected by adding the anhydrous gas from a commercial tank. Although addition of ammonia in the gaseous form offers the most convenience, one may add it in the form of aqueous solutions. Thus for the purposes of the invention, aqua ammonia may be considered the equivalent of gaseous ammonia. Where ammoniation is used it is preferred to apply a neutralization step at some stage prior to dehydration. For the purpose, one can use any non-toxic acid such as sulphuric, hydrochloric, phosphoric, citric, or the like in a quantity sufficient to restore the alfalfa material to about its natural pH.

Although the litter in accordance with the invention can be used both indoors and outdoors, its main advantage is to the domestic pet owner for indoor use. Thus, where the litter is confined to the household, the absence of the offensive dried alfalfa odor is most appreciated.

EXAMPLE

The invention is further demonstrated by the following illustrative example.

Fresh green alfalfa (100 lbs.) was pressed by passing it through a set of sugar-cane rolls. There was formed 65 lbs. of press-cake.

The press-cake and 35 lbs. of water were placed in a cement mixer which was operated for about 5 minutes. The mass was then passed through the sugar-cane rolls.

The press-cake was again mixed for 5 minutes with 35 lbs. of water and the mass again passed through the sugar-cane rolls.

The press-cake was then dehydrated, yielding the product of the invention.

As a control, a sample of the original alfalfa was also dehydrated.

Tests were conducted to determine the water absorption characteristics of the two materials. It was found that the product of the invention would absorb 36% more water than the dehydrated alfalfa (control).

It was also noted that the product of the invention had a mild pleasant odor whereas the control sample had a strong unpleasant odor characteristic of dried alfalfa.

Urine was added to each of the materials in the proportion of 1 ml. urine per 100 grams of material. The resulting samples were allowed to stand at room temperature in an open container. After the third day both samples were smelled. The control sample exhibited a strong unpleasant odor; the product of the invention exhibited a much weaker odor. After 3 weeks it was observed that the control sample had a whitish mold growing on its surface. The product of the invention did not evidence any mold growth.

Having thus described the invention, what is claimed is:

1. A process for converting leafy green vegetative material into animal litter which is essentially free from the characteristic odor of dehydrated leafy vegetative material, which comprises -
   a. mixing a sufficient amount of ammonia into the vegetative material to preserve a given ph level,
   b. pressing leafy green vegetative material to remove the juice and to obtain a press-cake of solid fibrous material,
   c. washing the said press-cake,
   d. pressing the washed material to remove occluded wash water,
   e. dehydrating the press-cake from Step (d), and
   f. compressing the dehydrated material into particles suitable for use as animal litter.

2. The process of claim 1 wherein the leafy green vegetative material is fresh green alfalfa.

3. A process for converting alfalfa into animal litter which is essentially free from the characteristic odor of dehydrated alfalfa, which process comprises -
   a. mixing a sufficient amount of ammonia into the vegetative material to preserve a given ph level,
   b. pressing fresh green alfalfa to remove the juice and to obtain a press-cake of fibrous material,
   c. agitating the press-cake with added water for a sufficient period of time to break up the press-cake and mixing the resulting particles with the water,
   d. pressing the resulting wet mass to remove occluded water, and
   e. dehydrating the resulting press-cake.

4. The process of claim 3 wherein the dehydrated material is compressed into pellets.

5. The process of claim 3 wherein, prior to dehydration, the press-cake from step (d) is re-agitated with added water and the resulting wet mass is re-pressed to remove occluded water.

6. A composition for use as an animal litter comprising a particulate, compressed, washed, and dehydrated, chlorophyll-containing leafy vegetative material characterized by the properties of readily absorbing liquids, having a color suitable for masking animal wastes deposited in the litter, including a sufficient active quantity of chlorophyll therein to suppress and destroy odors emanating from said wastes, and also including a sufficient quantity of ammonia to preserve a given ph level, said washed composition being essentially free from the characteristic odor of dehydrated leafy vegetative material.

7. The composition of claim 6 wherein the vegetative material is alfalfa.

8. The composition of claim 6 which has the additional characteristic of being essentially free from sugars.

* * * * *